US012647761B2

(12) United States Patent
Ferre et al.

(10) Patent No.: US 12,647,761 B2
(45) Date of Patent: Jun. 2, 2026

(54) BLUETOOTH TRANSMISSION FROM A SATELLITE TO A GROUND TELECOMMUNICATION TERMINAL

(71) Applicants: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); CYMOON, Toulouse (FR)

(72) Inventors: Guillaume Ferre, Gradignan (FR); Philippe Lattes, Toulouse (FR)

(73) Assignees: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); CYMOON, Toulouse (FR)

( * ) Notice: Subject to any disclaimer, the term of this patent is extended or adjusted under 35 U.S.C. 154(b) by 0 days.

(21) Appl. No.: 19/111,305

(22) PCT Filed: Sep. 13, 2023

(86) PCT No.: PCT/EP2023/075192
§ 371 (c)(1),
(2) Date: Mar. 12, 2025

(87) PCT Pub. No.: WO2024/056759
PCT Pub. Date: Mar. 21, 2024

(65) Prior Publication Data
US 2026/0089473 A1 Mar. 26, 2026

(30) Foreign Application Priority Data

Sep. 14, 2022 (FR) ...................................... 2209237

(51) Int. Cl.
*H04W 4/00* (2018.01)
*H04B 7/185* (2006.01)
(Continued)

(52) U.S. Cl.
CPC .......... *H04W 4/80* (2018.02); *H04B 7/18513* (2013.01); *H04W 4/029* (2018.02); *H04W 4/06* (2013.01)

(58) Field of Classification Search
CPC ......... H04W 4/80; H04W 4/029; H04W 4/06; H04B 7/18513
See application file for complete search history.

(56) References Cited

U.S. PATENT DOCUMENTS

| | | | |
|---|---|---|---|
| 2016/0029148 A1* | 1/2016 | Jackson | .................. H04W 4/70 |
| | | | 455/41.2 |
| 2018/0239948 A1* | 8/2018 | Rutschman | ............... G06T 7/20 |

(Continued)

FOREIGN PATENT DOCUMENTS

| | | |
|---|---|---|
| CN | 215222500 U | 12/2021 |
| WO | 2022076548 A1 | 4/2022 |
| WO | 2022076548 A9 | 10/2022 |

OTHER PUBLICATIONS

Foreign Communication from a Related Counterpart Application, International Search Report and Written Opinion dated Dec. 5, 2023, International Application No. PCT/EP2023/075192 filed on Sep. 13, 2023.

(Continued)

*Primary Examiner* — Ping Y Hsieh
(74) *Attorney, Agent, or Firm* — Conley Rose, P.C

(57) ABSTRACT
A device capable of being installed on a satellite, comprising telecommunication means for broadcasting information directly to at least one telecommunication terminal on the ground. The information is broadcast according to a Blu- (Continued)

etooth Low Energy protocol, and in AD mode. The device can be used in particular for an Earth observation satellite.

10 Claims, 2 Drawing Sheets

(51) Int. Cl.
| | |
|---|---|
| *H04W 4/029* | (2018.01) |
| *H04W 4/06* | (2009.01) |
| *H04W 4/80* | (2018.01) |

(56) References Cited

U.S. PATENT DOCUMENTS

| | | | |
|---|---|---|---|
| 2018/0254825 A1* | 9/2018 | Speidel | H04B 7/18513 |
| 2021/0294993 A1* | 9/2021 | Sundaresan | G06K 7/10366 |
| 2021/0320715 A1* | 10/2021 | Giftakis | H04B 7/18582 |
| 2022/0216896 A1* | 7/2022 | Speidel | H04B 7/0408 |
| 2022/0240084 A1* | 7/2022 | Speidel | H04B 7/18565 |

OTHER PUBLICATIONS

"Understanding Bluetooth Range", Aug. 19, 2022, Retrieved from the Internet: https ://www.bluetooth.com/leam-about-bluetooth/key-attributes/range/ [retrieved on May 4, 2023] XP093044476.

"Bluetooth Range Estimator—Path Loss (Propagation) Models", Nov. 23, 2023, Retrieved from the Internet on Nov. 23, 2023, XP093104828.

"Two-ray ground-reflection model—Wikipedia", Feb. 13, 2022, Retrieved from the Internet: https://en.wikipedia.org/w/index.php?title=Two-ray_ground-reflection_model&oldid=I071641723 [retrieved on Nov. 23, 2023] XP093104829.

Foreign Communication from a Related Counterpart Application, Chinese First Office Action dated Feb. 13, 2026, Chinese Application No. 202380065964.1 filed on Sep. 13, 2023.

* cited by examiner

[Fig. 1]
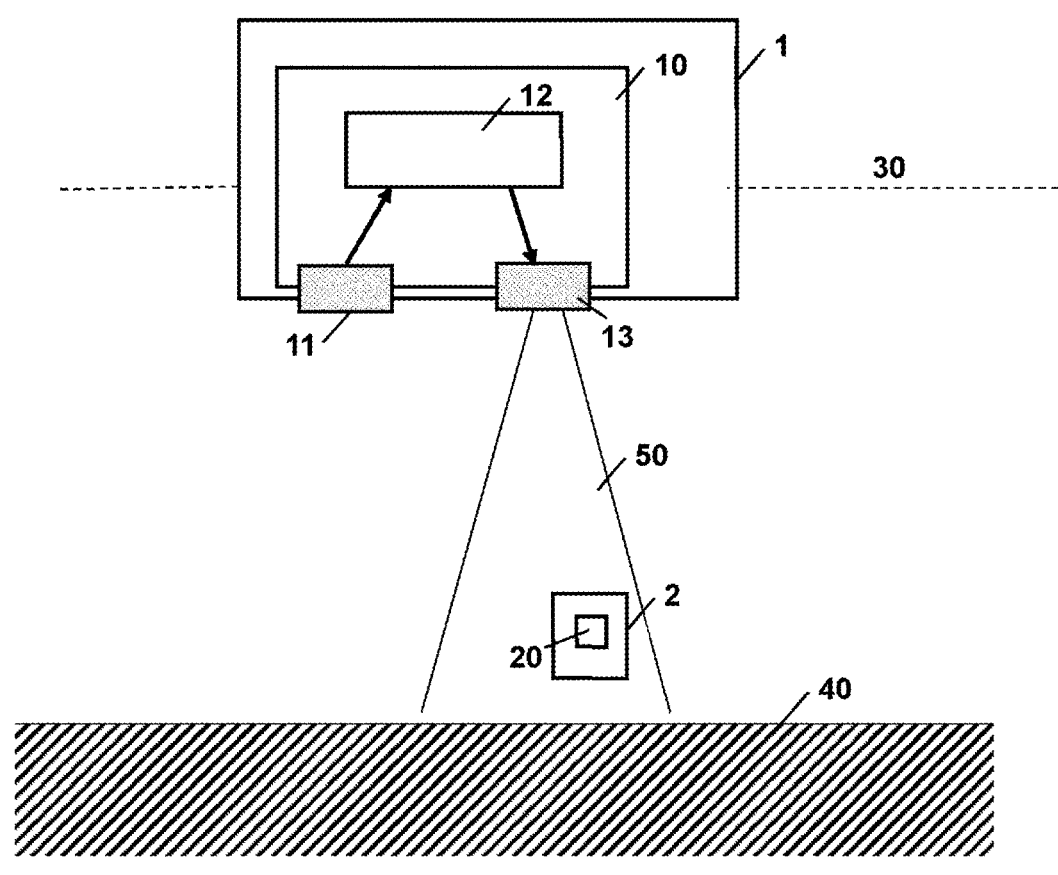
[Fig. 2]
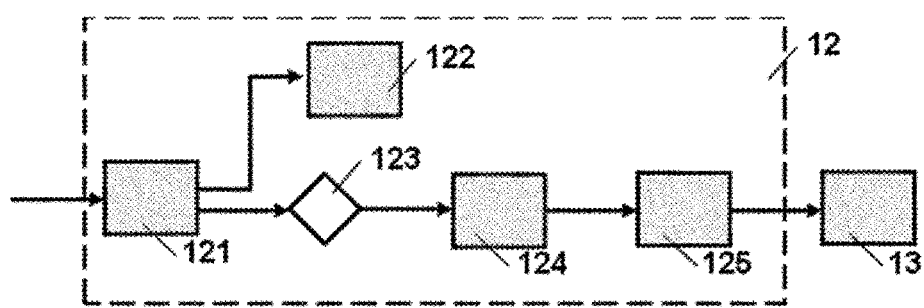

[Fig. 3]
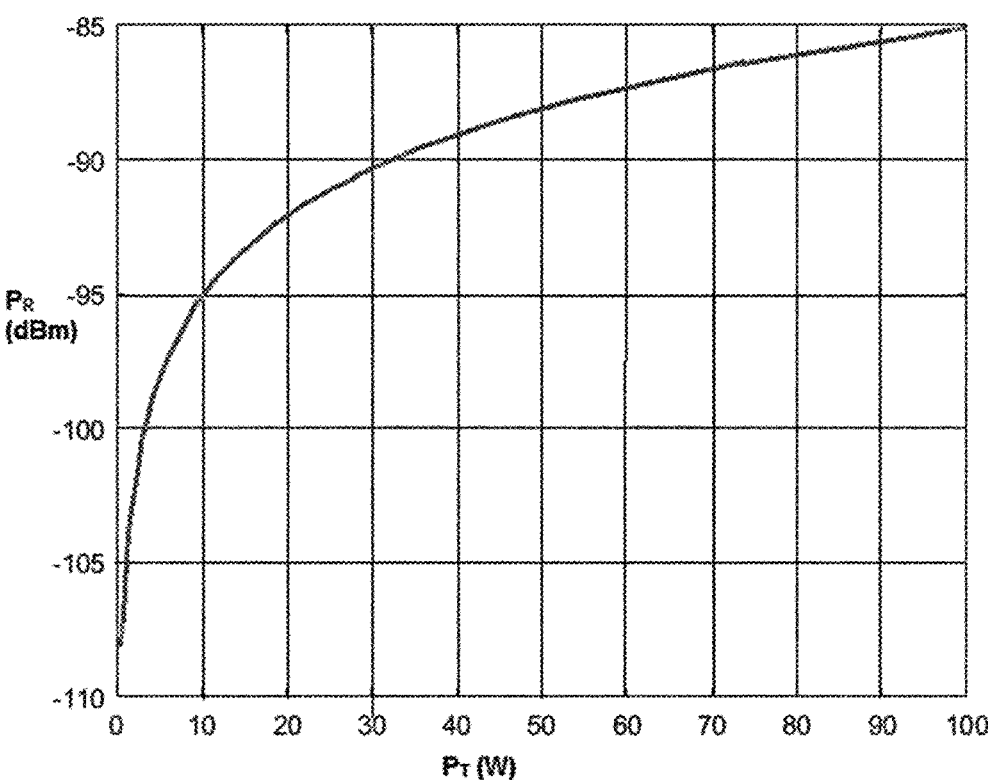
[Fig. 4]
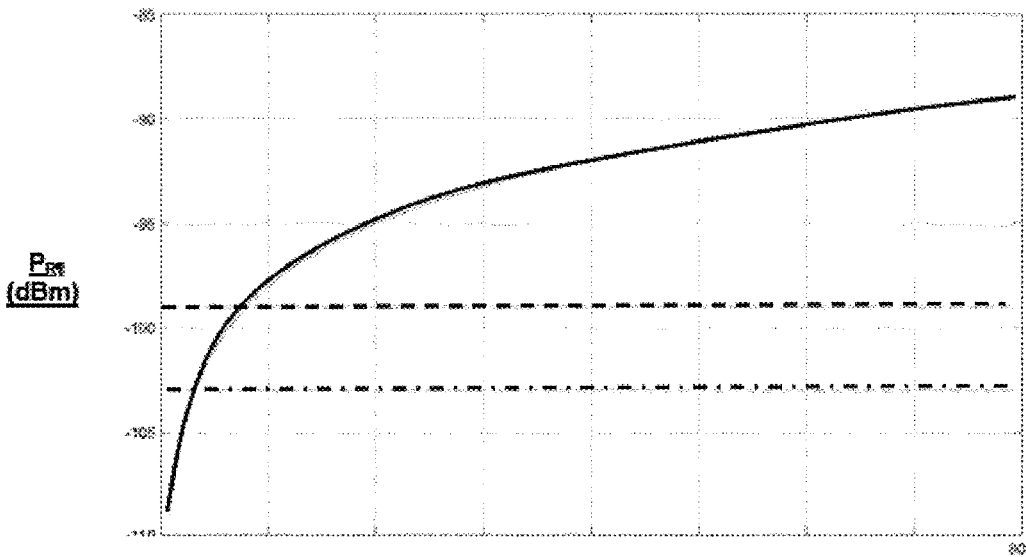

BLUETOOTH TRANSMISSION FROM A SATELLITE TO A GROUND TELECOMMUNICATION TERMINAL

CROSS-REFERENCE TO RELATED APPLICATIONS

The present application is a filing under 35 U.S.C. 371 as the National Stage of International Application No. PCT/EP2023/075192, filed Sep. 13, 2023, entitled "BLUETOOTH TRANSMISSION FROM A SATELLITE TO A GROUND TELECOMMUNICATION TERMINAL," which claims priority to French Application No. 2209237 filed with the Intellectual Property Office of France on Sep. 14, 2022, both of which are incorporated herein by reference in their entirety for all purposes.

FIELD OF THE INVENTION

The present invention relates to satellites, and in particular to the direct transmission of information from a satellite to one or more telecommunication terminals.

In particular, it applies to satellites with on-board information processing equipment, enabling the transmission of information from this processing directly to this or these telecommunication terminal(s). The invention applies in particular to Bluetooth-enabled mobile or smartphone terminals.

BACKGROUND OF THE INVENTION

In critical situations, such as natural disasters, it can be crucial to be able to directly provide information to people living in the affected area as soon as possible.

However, some regions of the world are still relatively poorly covered by telecoms infrastructures, so that the transmission of warning messages is impossible in many areas, or could rapidly lead to saturation of the existing infrastructure. This saturation would not only prevent the entire population concerned from being informed early enough, but would also penalize the communications needed by the emergency services.

Furthermore, in the event of natural disasters (floods, earthquakes, major fires, etc.), the telecoms infrastructure may be impacted, no longer functioning and thus unable to communicate the necessary information.

Moreover, an ever-increasing number of satellites is continuously acquiring an extremely large volume of information. More and more satellites are observing our planet, providing increasingly precise coverage of the Earth's surface.

Currently, this information is transmitted by observation satellites to ground stations, where it can be analyzed. The results of these analyses can then be passed on to the end users (or "consumers").

The volume of information to be processed has now reached such dimensions that it is difficult to exploit, and it causes congestion at ground stations. The delay between capturing information and transmitting it to users can be penalizing, or even render the information obsolete by the time it is received.

Studies show that only a small percentage of the information captured is actually exploited and used, so that useful information is drowned out by the flood of useless information.

Advances in on-board systems mean that satellites, especially observation satellites, have increasing processing capacity, both in terms of on-board memory and digital processing resources (CPU, GPU, specialized circuits, etc.).

Today, however, these processing capacities do not allow us to improve the information transmission chain, to reach end-users quickly, or to make efficient use of the large volume of information available.

Current mechanisms are therefore unable to alert the population concerned quickly and directly enough, particularly in the absence of ground telecommunications infrastructures, even if an observation satellite had been able to detect a critical situation or the imminence of such a situation.

This inadequacy of the state of the art means that it is not possible to minimize the impact of a critical situation, for example by organizing an evacuation of the population or, at the very least, by preventing the population from unwittingly moving into a risk zone, by warning to avoid panic, by providing instructions on how to behave, etc.

There is therefore a need to facilitate the transmission of relevant information to a population located on a site affected by a critical situation or by an imminent risk of a critical situation, particularly in the absence of a ground communications infrastructure.

Documents US2022/216896A1 and US2018/254825A1 relate to satellites with cellular telecommunication means for broadcasting information to at least one telecommunication terminal on the ground, based on a terrestrial cellular network infrastructure.

SUMMARY OF THE INVENTION

The aim of the invention is to provide a mechanism for broadcasting information from satellites directly to telecommunication terminals. The term "direct" here means that the information transmitted by a satellite is received by the terminals. In other words, no ground telecommunications infrastructure (base stations, cellular network, etc.) is affected by this broadcast.

To this end, according to a first aspect, the present invention can be implemented by a device suitable for being placed on board a satellite, comprising telecommunication means for broadcasting information directly to at least one telecommunication terminal on the ground; said telecommunication means being adapted to broadcast said information via the Bluetooth low energy communication protocol, BLE, according to an "advertising" mode, according to which no incoming connection is accepted, said at least one telecommunication terminal being compatible with said communication protocol and configured to receive said information without sending any connection request to the satellite's communication means, said telecommunication means comprising:

a directional antenna adapted to transmit a signal carrying said information in a broadcast cone, with a transmission power greater than or equal to a few Watts in a frequency band between 2.4 and 2.8 GHZ, at a bit rate of at least 125 kbits/s, said transmission power being determined so that a power of a signal received by at least one said terminal located in the broadcast cone is above a given sensitivity of reception of said terminal for said "advertising" mode, as a function of an elevation of the satellite with respect to the ground, an antenna directivity, satellite pointing parameters and standard transmission losses related to passing through the atmosphere.

The satellite can be a telecommunications satellite, an earth observation satellite (especially a remote sensing satellite), or any other type of satellite.

This embodiment of the invention also makes it possible to take advantage of the growing capacities of observation satellites, and to avoid the processing (and non-processing) delays of the usual processing chain.

To achieve this, the device also includes:

at least one sensor for acquiring primary information processing means for analyzing said primary information in order to detect within said primary information a situation corresponding to a criterion, and determining secondary information relating to said situation; and said telecommunication means are provided to transmit said secondary information within said information.

This secondary information corresponds to (or are parts of) the information broadcast by the previously defined device. In one embodiment, the two terms are equivalent when only secondary information is broadcast.

According to embodiments, the invention comprises one or several of the following features which may be used separately or in partial combination with one another or in total combination with one another:

said primary information is images.

the telecommunication means are adapted to broadcast said information via the Bluetooth protocol, for example in a BLE 125 k S=8 mode.

said processing means are adapted to precompensate a frequency shift related to the Doppler effect as a function of a position of said satellite, a position of said at least one telecommunication terminal, and the speed of said satellite relative to the ground.

said secondary information is representative of an alert.

According to a second aspect, the invention can also be implemented by a satellite comprising a device as previously defined, optionally with one or more of the optional features described.

According to another aspect, the invention can also be implemented by a system comprising at least one such satellite and said at least one telecommunication terminal.

According to another aspect, the invention also relates to a method of broadcasting information from a satellite directly to at least one telecommunication terminal on the ground. Said method implements the Bluetooth Low Energy protocol, BLE, in an "Advertising" mode, according to which telecommunication means of the satellite are adapted to broadcast said information without accepting any incoming connection and said at least one telecommunication terminal (2) is compatible with said protocol and configured to receive said information without sending any connection request to the telecommunication means of the satellite, said method comprising:

transmission by a matched directional antenna of a signal carrying said information in a broadcast cone, with a transmission power, produced by a power amplifier conforming to the requirements of an on-board system, said transmission power being greater than or equal to a few watts, in a frequency band between 2.4 and 2.8 GHz, with a data rate of 125 kbits/s, said transmission power being determined so that a power of a signal received by at least one said terminal located in the broadcasting cone, is above a reception sensitivity of said terminal, corresponding to said "Advertising" mode, as a function of an elevation of the satellite with respect to the ground, an antenna directivity, satellite pointing parameters and standard transmission losses linked to passing through the atmosphere.

According to embodiments, the method is adapted to implement one or more of the previously described features, mutatis mutandis, which may be used separately or in partial combination with one another or in total combination with one another.

According to another aspect, the invention may be implemented by a computer program comprising instructions which, when the program is executed by a computer, cause said computer to implement the as described above.

Further features and advantages of the invention will become apparent from the following description of a preferred embodiment of the invention, given by way of example and with reference to the attached drawings.

BRIEF DESCRIPTION OF THE FIGURES

The attached drawings show the invention:

FIG. 1 schematically represents an example of functional architecture according to one embodiment of the invention.

FIG. 2 schematically depicts an example of the detailed functional architecture of processing means, according to one embodiment of the invention.

FIG. 3 shows a simulation of the evolution of the satellite's reception power in relation to its transmission power, according to one embodiment of the invention.

FIG. 4 shows a simulation of the evolution of the satellite's reception power in relation to its transmission power, according to another embodiment of the invention.

DETAILED DESCRIPTION OF EMBODIMENTS OF THE INVENTION

The invention relates to all types of satellites, in particular telecommunication satellites and observation satellites.

According to embodiments, it relates in particular to Earth observation satellites, especially remote sensing satellites.

It can also be related to constellation-type low-earth orbit telecommunication satellites used to relay information back to Earth from other satellites, particularly Earth observation satellites.

It can also relate to the transmission of information from ground stations by telecommunications satellites.

An Earth observation satellite is an artificial satellite used to make geophysical and geographical observations of the Earth from an Earth orbit. This category of satellite is used for purposes such as meteorology, natural resource inventory, geodesy, climate study and modeling, natural disaster prevention and monitoring, military reconnaissance, etc.

The majority of Earth observation satellites fall into the category of remote sensing satellites, whose instruments analyze electromagnetic waves (visible light, but also ultraviolet, infrared, X-rays, etc.) emitted either by the object under observation, or by a wave train emitted by the satellite. Typically, the instruments used are cameras, spectrometers, radars, radiometers and so on. For example, the Pleiades, Sentinel and METEOSAT satellites fall into this category of remote sensing satellites.

A second category of Earth observation satellites only carry out in situ measurements such as GOCE, which measures the Earth's gravitational field, or SWARM, which measures the Earth's magnetic field, and which are not remote sensing satellites. They use instruments such as magnetometers, passive receivers like laser reflectors, GPS, accelerometers or ion or neutral atom detectors, etc.

Generally speaking, an observation satellite comprises on-board resources for managing the satellite itself (power supply, positioning, etc.) and a device representing its payload, that is, on-board functions that are useful for third parties and not for its own operation. An observation satellite device of this type therefore includes means for fulfilling its observation function, that is, essentially observation means and telecommunication means for transmitting the observed information to the ground. The invention mainly relates to such a device, referenced 10 in FIG. 1, for a satellite 1.

In FIG. 1, the satellite 1 is located in orbit 30 around the earth 40.

In one embodiment of the invention, the satellite is located in a Low Earth Orbit (LEO), but in other embodiments it may be in other orbits such as GEO (Geostationary Earth Orbit, etc.).

The device 10 is suitable for installation in the satellite 1 and, in FIG. 1, is shown actually installed in the satellite.

According to the invention, this device 10 includes telecommunication means 13 for broadcasting information directly to at least one telecommunication terminal 2 on the ground 40.

The signal emitted by the telecommunication means 13 forms a cone 50 whose aperture (or solid angle) depends on the directivity of these means (antenna). Mobile terminals located in the center of this broadcast cone 50 receive the signal in the best possible conditions.

In the case where the satellite is an observation satellite, device 10 may further comprise:

one or more sensors 11 for acquiring primary information and processing means 12 for analyzing this primary information in order to detect within it a situation corresponding to a predefined criterion, and to determine secondary information relating to said situation.

The telecommunication means 13 are then designed to transmit this secondary information (in other words, it represents the information indicated in the previous paragraph)

In the case of a communications satellite, the information broadcast may be acquired by other means, for example received by the satellite from a ground station or another satellite. For example, an observation satellite could transmit secondary information to a transmission satellite, which would then broadcast it to ground terminals. This embodiment can relieve observation satellites of this function and/or enable them to reach other coverage areas, since each satellite can only broadcast to a defined geographical area (which can vary over time, in the case of moving satellites).

The primary information acquired, or "captured", by the sensor(s) 11 corresponds to the various items of information observed by the observation satellites. As we saw earlier, observation satellites are extremely varied, and so the observation spectrum is vast: optical, radar, infrared, ultraviolet, listening for radioelectric or electromagnetic signals, ionic radiation, and so on.

Examples of electromagnetic signals include AIS (Automatic Identification System) ship beacon signals, which are electronic messages between ships via VHF radio waves, enabling ships and land-based traffic monitoring systems to know the identity, status, characteristics, position, course and speed of ships in the navigation zone. Mechanisms for detecting these signals by satellite have already been proposed. Another example is ADS-B (Automatic Dependent Surveillance-Broadcast), a cooperative surveillance system for air traffic control and related applications. An ADS-B-equipped aircraft determines its position via a satellite positioning system (GNSS for "Geolocation and Navigation Satellite System") and periodically sends this position and other information to ground stations and other ADS-B-equipped aircraft operating in the area.

Primary information can be extremely varied.

In one embodiment, the primary information is images. These images can be two-dimensional representations of an observed portion of the earth. Typically, observation satellites acquire streams of images, each image being associated with a location of the satellite relative to the earth.

Image content (that is, the information associated with each point on the observed surface of the earth) depends on the type of sensor(s) 11: optical (or "photographic"), radar, infrared, etc.

The primary information is analyzed by the processing means 12 of the device 10 on board the satellite 1.

These processing means can be adapted to perform this analysis according to a granularity specific to the structure of the primary information. For example, this analysis can be performed frame by frame.

This analysis step is represented by reference 121 in FIG. 2.

The result of this analysis can be processed in the usual way, 122, corresponding to normal operation of satellite 1. For example, this result may be stored in an on-board memory, it may be sent to a ground station for further processing, and so on. This step is optional and external to the invention.

A test step 123 is provided to detect a situation corresponding to a criterion within the primary information.

The criterion in question can be varied. Generally speaking, it aims to discriminate between normal and critical situations within primary information. This is a conventional problem for classifying and processing digital data. Various solutions are available to those skilled in the art, and do not need to be developed here.

However, this criterion can be either fixed or adaptive. It can be single or multiple. It can, for example, be formalized as a loss function when the analysis is implemented by a multi-layer neural network.

The state of the art includes ground-based image analysis systems for measuring precipitation volumes, river levels, lava or mud flows, fire detection, storm warning, etc.

References include the book "Aléas et surveillance de l'activité volcanique 2: sismologie, déformation et télédétection" by Jean-François Lenat, ISTE éditions, 2022, ISBN 9781789480450, or the articles by Bonakdari, H., Zaji, A. H., Soltani, K., & Gharabaghi, B., "Amélioration de la précision d'un système d'alerte de crue par télédétection à l'aide d'une méthode de prétraitement multi-objectifs pour la détection et l'élimination des défauts de signal" in Comptes Rendus Géosciences, 352, 73-86 (2020), or Catry, T., Révillion, C., Mouquet, P., & Pennober, G., "Apports de l'imagerie satellite pour le suivi de l'impact des événements cycloniques à Madagascar. Complémentarité des échelles et des capteur", in EchoGéo, (51), 2020.

As long as a situation corresponding to the criterion is not detected, the mechanism can loop back to step 121 to analyze a new portion of the primary information (a new image, for example).

When a situation corresponding to the criterion is detected, a step 124 for determining secondary information relating to this situation is triggered.

This secondary information may include the result of the analysis performed in step 121.

Secondary information can also be enriched with other data, such as a satellite identifier, timestamp, satellite location, etc.

Generally speaking, secondary information corresponds to a semantically higher level than primary information, due to the processing applied. It is also smaller in size.

The share of secondary information, provided directly by the analysis 121, may contain data of the same nature as the primary information.

For example, they may contain an image representing a geographical area but representing semantic data derived from processing: for example, a segmentation may discriminate image points corresponding to a detected critical situation, or different color levels may correspond to different levels of severity of a situation, or to a type of situation (flood, fire, destruction, etc.), labels may be associated with image points, or with areas derived from a segmentation, and representing terrain type or cloud cover, etc.

In addition, other types of data may result from the analysis 121 without being of the same nature as the primary information: for example, a type of critical situation, an estimated level of severity, the size of the area concerned, the geolocation of the area concerned, etc.

In one embodiment, this secondary information is representative of an alert. Ground terminals can have the means to effectively alert users based on this secondary information.

It is well understood that there are various possible ways of determining secondary information that can be suitably exploited by ground telecommunication terminals, equipped with a suitable software application.

This secondary information is then formatted, step 125, for broadcasting by the satellite's on-board telecommunication means 13.

The aim of formatting is to convert digital data into analog data, typically by modulating a carrier signal, according to the specifications of a telecommunication protocol used by telecommunication means 13 to broadcast information to ground terminals.

The references 121-125 in FIG. 2 can be seen as steps in a process implementing one embodiment of the invention, but also as modules in a functional architecture. Processing means 12 can be implemented by an assembly of electronic circuits and/or by software modules running on an information processing infrastructure.

According to one embodiment of the invention, the protocol used is the Bluetooth protocol.

According to the collaborative encyclopedia Wikipedia, "Bluetooth is a telecommunications standard for the two-way exchange of data over short distances using UHF radio waves in the 2.4 GHz frequency band. Its aim is to simplify connections between nearby electronic devices by eliminating wired links. For example, it can replace cables between computers, tablets, speakers, cell phones between each other, or with printers, scanners, keyboards, mice, joysticks, cell phones, PDAs, hands-free systems for microphones or headphones, car radios, digital cameras, barcode scanners and interactive advertising kiosks." (https://fr.wikipedia.org/wiki/Bluetooth)

One of the advantages of the Bluetooth protocol is that it is implemented on the vast majority of telecommunications terminals on the market.

The proposed mechanism can therefore operate on existing terminals, and requires no hardware modification. In particular, this mechanism is in contrast to the use of specific terminals for satellite telecommunications, such as those adapted to the Iridium network, which are much less widespread and more expensive.

Furthermore, the reception of information by ground terminals is independent of the subscription to any type of service. This makes it possible to address all handset owners, even without a subscription to an operator, and even in areas not covered by ground networks.

Broadcasting secondary information via satellite using this telecommunication protocol means that it can be received by most of the world's terminals, and thus, for example, alert a large number of people concerned by a critical situation or a detected risk.

Insofar as telecommunication terminals can be mobile terminals, particularly of the "smartphone" type, likely to be constantly accessible to users, even when they are on the move, they can be alerted extremely quickly, as soon as a satellite detects a critical situation, or an imminent risk of a critical situation, regardless of network coverage.

Furthermore there is also a Bluetooth protocol for broadcasting information to a range of terminals. In telecommunications, broadcasting is a technique for a one-way (or unidirectional) transmission of signals to a large number of customers. This is in contrast to multicast and unicast, which represent direct, individualized or "connected" links between sender and receiver.

Thus, according to the invention, the telecommunication means 13 of satellite 1 do not have to know the ground terminals individually, but simply transmit. When they receive the information, ground terminals can recognize it as a broadcast signal and therefore consider themselves as receivers (without their own address being indicated in the signal, as in unicast or multicast mode, for example).

It is clear that the Bluetooth protocol was designed for communications between devices in close proximity. Its use for broadcasting information between a satellite and ground terminals is therefore completely disruptive.

The inventors have carried out simulations to demonstrate that the Bluetooth protocol can be used over long distances in the context of the invention, under certain conditions defined by the inventors.

A further constraint on the usual operation of the Bluetooth protocol is the initial pairing phase between two devices before information is exchanged. In the context of the invention, it is impossible to set up such a pairing between the satellite and the ground terminals, on the one hand because it would require a transmission power of the ground terminals that is incompatible with their specifications, but also because it would involve a great deal of weight and load on the satellites which, potentially, would have to pair up with thousands of ground terminals, and, if the satellite is moving, would have to repeat this operation regularly.

The inventors have identified a particular operating mode of the Bluetooth protocol, known as "Advertising", which satisfies the two constraints of avoiding the pairing mechanism and enabling broadcasting, and can thus be used to implement the invention.

These aspects of the Bluetooth protocol are described and specified in the "Core specification" normative document, available on the official website http://www.bluetoothe.com. This document is currently available in version 5.3, dated Jul. 13, 2021.

"Advertising" mode allows several types of connection via the Generic Access Profile (GAP) mechanism, described in section 6.2. In particular, there's a "Broadcaster" mode, wherein the sender sends information without allowing (and therefore without waiting for) a return. This mode can typically be used to implement the invention.

In one embodiment, this operating mode corresponds to the BLE protocol. In one embodiment, the BLE protocol is used.

Bluetooth Low Energy (BLE or BTLE) is a wireless transmission technology created by Nokia in 2006 as an open standard based on Bluetooth, which it complements but does not replace. It has been integrated into Bluetooth standards since version v4.0 published in June 2010 by the Bluetooth SIG.

According to Wikipedia, "Compared with Bluetooth, BLE offers a data rate of the same order of magnitude (1 Mbit/s) for 10 times less energy consumption. This enables the technology to be integrated into new types of equipment such as watches, medical monitoring devices or sports sensors. The technology enables devices to connect within a radius of around 10 meters."

One of the advantages of the BLE protocol is its lower energy consumption, which is an important consideration for a satellite-mounted device.

Bluetooth devices send packets in order to broadcast data in advertising mode. These are 31-byte blocks that can contain information specific to the transmitter. They are also used to enable other devices to connect to them (pairing). There are several types of "Advertising" packets, each enabling different functionalities (used for Direct or Indirect Advertising, with or without the possibility of connection).

Bluetooth enables bidirectional or unidirectional data exchange using UHF radio waves, and operates in the 2.4 GHz band. 40 physical channels are allocated for time and frequency multiplexing, each 2 MHz apart (that is, from 2.4 GHz to 2.8 GHZ). Some channels are used for advertising, while others are used for unicast or multicast transmissions.

According to the BLE standard, an object can have up to 4 functions. In particular:

Broadcaster: can act as a server. Thus, its purpose is to transmit data to a device on a regular basis, but it does not accept any incoming connections;

Observer: the object can only listen to and interpret data sent by a broadcaster. In this situation, the object cannot send connections to the server.

In this embodiment, the satellite can implement the "broadcaster" part of this BLE protocol mode of operation, while the ground telecom terminals implement the "observer" part.

As we saw earlier, secondary information can (due to its high-level semantic content) be of low volume. The use of the BLE protocol is therefore justified. Depending on the standard, the BLE protocol can operate at different data rates.

In one embodiment of the invention, a data rate of 125 kbits/s. is used. Furthermore, the S=8 mode can be used. This mode indicates that 8 symbols per data item are used for transmission during modulation, which reduces the useful data rate but provides greater robustness and therefore sensitivity. This BLE protocol mode corresponds to a sensitivity of −103 dBm.

This BLE protocol is described and specified in the aforementioned normative document. On page 218, in particular, there is a table summarizing the various possible BLE modes.

The signal strength received by the ground telephone must be higher than the sensitivity of the receiver.

According to simulations carried out by the inventors, this mode of operation of the BLE protocol (125 k S=8) makes it possible, using a low-orbit satellite, to close the link budget using satellite-directed antennas, at a transmission power in phase with what a commercial power amplifier can generate from a low-orbit satellite.

Antenna directivity may depend on a compromise between satellite stability and maximum power consumption. In fact, the more directive the antenna, the more stable the satellite will need to be in terms of pointing towards the Earth, and the lower the transmission power required.

FIG. 3 illustrates a simulation of the evolution of the reception power PR (by a ground telecom terminal) in relation to the transmission power PT of the satellite. This simulation was obtained by considering a transmitting antenna with a directivity defined by a −3 dB aperture angle of 20° and a gain of 18 dBi, and a receiver located at the satellite's nadir (that is, at the point on the ground located vertically between the satellite and the center of the Earth).

This curve shows that for low transmission powers PT, reception power increases very quickly. Thus, from just a few watts of power transmitted by the satellite, the sensitivity required by the receiver (that is, −103 DB) is achieved. In the example curve in FIG. 3, this sensitivity is achieved at around 1.5 W of transmitted power. Satellite elevation, cloud cover and satellite pointing parameters can all influence this figure.

FIG. 4 illustrates another simulation of the evolution of the reception power PR (by a ground telecom terminal) compared with the transmission power PT of the satellite, based on different assumptions, in particular a lower antenna gain and taking into account the fact that the receiver may be located elsewhere than at nadir, and in particular at the edge of coverage.

The following is an example of a link budget calculation, based on the assumptions of the simulation in FIG. 4 and applying a realistic margin of error to the link budget.

The following parameters are considered:

BLE mode 125 k S=8,

Satellite elevation H equal to 550 km,

BLE receiver sensitivity: S=−103 dBm,

Link budget margin: Margin=4 dB,

Atmospheric losses at 2.4 Ghz: $L_{atm}$=0.5 dB,

Polarization losses: $L_{pol}$=3 dB,

Insertion losses: $L_i$=2 dB,

Directivity of the antenna defined by an aperture angle at −3 dB of 20°, which corresponds to a maximum communication distance (at the edge of coverage) for H=550 km: $D_{max}$=560 km, Maximum Path Loss: PL=155 dB (as indicated, for example, on the https://en.wikipedia.org/wiki/Path loss web page), Transmitting antenna gain: $G_{tx}$=15 dBi, and Average receiving antenna gain: $G_{rx}$=0.5 dBi.

Satellite nadir losses are defined as follows:

$$PL + L_{atm} + L_{pol} + L_i = 160.5 \text{ dB, and}$$

losses at −3 dB as follows:

$$\text{Losses @ 3 dB} = PL + L_{atm} + L_{pol} + L_I = 163.5 \text{ dB}$$

For the telecommunication terminal to be able to demodulate the signal broadcast in BLE 125 k S=8 mode by the satellite, a minimum reception power of Min(Prx) is required:

$$\text{Min}(P_{rx}) = S + \text{Margin} = -103 + 4 = -99 \text{ dBm}$$

Using the telecommunications equation, we can write that the transmission power Ptx is:

$$Ptx = \text{Min}(Prx) + \text{Losses} @ 2 \text{ dB} - (G_{tx} - G_{rx}).$$

Replacing with the above numerical values gives:

$$Ptx = -99 + 163.5 - 15.5 = 49 \text{ dBm, which corresponds to approx. 79.5 W.}$$

The satellite EIRP is therefore: Ptx+Gtx=64 dBm.

It can be seen that with the realistic assumptions of the calculation detailed above, the required sensitivity S is achieved for a power of a few tens of watts, which corresponds to quite conventional transmission power values for the means of communication 13.

Of course, other curves, and therefore other minimum transmission powers, are possible depending on the telecommunication protocol used to broadcast the information. In particular, the "BLE 125 k s=0" protocol, one example of which is described here, may be subject to standardization changes in the future, which could have an impact on this performance curve. Furthermore, other modes of the BLE protocol, associated with higher data rates, for example 250 kbits/s, 500 kbits/s; 1M or even 2M could also be used.

In any case, it is clear that the use of this Bluetooth standard operating mode enables information to be broadcast from a satellite to ground-based terminals 2, with capacities that are customary for telecommunication means 13 and in line with the requirements of an on-board system.

Other modes of implementation are, of course, possible, especially depending on the evolution of the various telecommunication standards in the future, or the appearance of new standards.

In the case of a moving satellite (in low-Earth orbit or other), the satellite's movement relative to the ground terminals distorts the transmitted signal through the Doppler effect (frequency shift).

As the Bluetooth protocol is designed for communication between nearby objects at zero or low relative speeds, it doesn't provide a device for natively recovering these signal distortions.

Simulations carried out by the inventors have demonstrated a sensitivity loss of the order of 4 dB and a packet loss rate of the order of 10-2.

According to one embodiment of the invention, processing means 12 are adapted to pre-compensate for the frequency shift linked to the Doppler effect as a function of a satellite position, a telecommunication terminal position and the satellite's speed relative to the ground. This pre-compensation is designed to eliminate, or at least greatly reduce, the loss of sensitivity and the increase in packet loss rate.

This pre-compensation is in fact possible insofar as the telecommunication means 13 are aware of the position of the mobile terminals 2 to which the information is broadcast, since these means are directional (that is, on the footprint of the broadcast cone 50).

If the solid angle of this scattering cone is small enough, the differences due to the Doppler effect between the different positions of this footprint can be considered negligible.

This pre-compensation can be performed by device 10 by pre-processing the complex envelope of the signal before broadcasting.

If we denote x(n) the signal to be broadcast (which would therefore actually be broadcast if the Doppler effect were not taken into account), according to one embodiment, a pre-compensated signal y(n) is formed defined by:

$$y(n) = x(n) \cdot e^{-j\hat{\theta}_{D,S}(n)} \qquad \text{[Math. 1]}$$

In this expression, $\hat{\theta}_{D,S}(n)$ represents the estimated instantaneous phase representing the Doppler variation to be compensated on surface S, which represents the footprint of diffusion cone 50.

Thus, the received signal being naturally perturbed by the Doppler effect $\hat{\theta}_{D,S}(n)$ will be written:

$$z(n) = y(n) \cdot e^{j\theta_{D,S}(n)} + w(n) \qquad \text{[Math. 2]}$$

The quantity w(n) represents the receiver's thermal noise.
Using the expression for the pre-compensated signal y(n), this expression can be written:

$$z(n) = x(n) \cdot e^{-j\hat{\theta}_{D,S}(n)} \cdot e^{j\theta_{D,S}(n)} + w(n) \qquad \text{[Math. 3]}$$

Or:

$$z(n) = x(n) \cdot e^{\varepsilon_{D,S}(n)} + w(n)$$

$\varepsilon_{D,S}(n)$ represents the estimation error of the Doppler effect, expressed by:

$$\varepsilon_{D,S}(n) = \theta_{D,S}(n) - \hat{\theta}_{D,S}(n) \qquad \text{[Math. 4]}$$

The variation in instantaneous phase $\hat{\theta}_{D,S}(n)$ caused by the Doppler effect can be estimated deterministically by knowing:
satellite position,
the position of the area on the ground to which the information is to be broadcast (corresponding to the footprint on the ground of the broadcast cone 50),
the carrier frequency,
the relative speed of the satellite with respect to the ground (or the telecom terminal, if it's in motion, bearing in mind that given the speed of the satellite relative to that of the terminal, the latter can be neglected).
This estimation aims to minimize the estimation error $\varepsilon_{D,S}(n)$ The instantaneous phase can be estimated using the physics equations for calculating the Doppler effect. Various ways of implementing these computational aspects are well described in the technical literature. One example is the article "Doppler Characterization for LEO Satellites" by Irfan Ali, Naofal Al-Dhahir and John E. Hershey in IEEE Transactions on Communications, vol. 46, No. 3, March 1998.

Telecommunications terminals 2 in the reception zone (the footprint of the broadcast cone) can therefore receive the information broadcast by the satellite with sufficient power to enable it to be processed correctly (demodulation with a sufficiently low error rate to enable reconstruction of the secondary information determined by processing means 12).

As we have already seen, the terminals can be state-of-the-art terminals. In particular, the usual telecommunication means are sufficient to enable them to receive the secondary information broadcast by the satellite. Thus, eliminates the need for special antennas, demodulation circuits and so on.

As we have seen, one embodiment of the invention uses the Bluetooth protocol, in particular the BLE 125 k s=8 operating mode of this protocol. The vast majority of telecom terminals are natively adapted to receive information broadcast using this protocol.

The telecommunication terminal can be of different types. This can be a fixed terminal (computer, TV set, etc.), or a mobile one (laptop, tablet, cell phone, etc.)

The telecommunication terminal includes a software application 20 adapted to continuously receive a data stream in a predefined channel.

As explained above, this channel can correspond to the Bluetooth telecommunication protocol, and more specifically to a broadcast mode of this protocol such as "BLE 125 k S=8".

The software application is also adapted to analyze the content of this data stream in order to detect said secondary information, determine within it data enabling, if necessary, an action to be triggered on the man-machine interface of the telecommunication terminal.

These data may include geolocation and/or situation type.

The software application can be adapted to compare this geolocation with the terminal's geolocation and only trigger an action if these two geolocations are sufficiently close. This notion of proximity can be fixed, configurable or adaptable, for example according to the type of situation or severity.

The software application can also be adapted to compare this type of situation with parameters set by the user of the telecommunication terminal indicating the type of services he wishes to subscribe to.

These parameters can be set by the application itself, so that several versions of the application can exist, each corresponding for example to a different type of user (general public, security professionals, etc.), or to different application fields.

An example of application could be the announcement of a critical situation (fire, flood, earthquake, major flood, etc.) to the population concerned. The critical situation can be detected by an observation satellite using primary information acquired and analyzed as explained above. It can also be carried out by other mechanisms and broadcast by a telecommunications satellite.

Terminals 2 receive Bluetooth broadcast streams when they are within the broadcast zone (footprint of broadcast cone 50) of the satellite. If the application 20 is suitably configured, it can analyze this incoming stream and determine whether an alarm should be triggered via the man-machine interface (display of a signal or message on a screen, audible alarm, vibration, etc.)

Other applications are possible, wherein users wish to be alerted to a particular situation as determined by a satellite or other systems.

This determination can include checking that the terminal's location is actually in an area affected by the critical situation (in a more refined way than the satellite broadcast mechanism could do), or whether the user has actually subscribed to the alert service, for example.

Thus, according to the invention, information is broadcast directly from a satellite to telecommunication terminals. They do not transit through other devices. So, in the event of a critical situation, such as a natural disaster, the invention's mechanism makes it possible to be unaffected by damage or even destruction of the ground telecommunications infrastructure, the presence of a ground network in the areas concerned, subscription to an operator, congestion of this same infrastructure due to the numerous communications initiated by the population during this type of event, and the possible partial destruction of telecommunication infrastructure devices.

The invention therefore makes it possible to resiliently maintain a communication channel to the people concerned, who may have been affected.

Furthermore, some regions are poorly covered by telecommunications infrastructures (wireline, cellular, WiFi, etc.). This is particularly true of remote rural areas. In this case, the invention enables alerts or, more generally, secondary information to be sent to mobile terminals in the absence of a telecommunications infrastructure.

In addition, according to some of the invention's embodiments, it makes it possible to take advantage of the growing capacities of observation satellites by directly transmitting an analysis result to end-users' mobile telecommunication terminals.

This enables them to obtain these results as soon as possible, without the need for ground stations to process the information or even retransmit it. These no longer form bottlenecks, lengthening the information transmission chain and slowing down the reception of relevant information by users.

This ability to transmit directly from satellites to users opens the way to new applications and services, particularly in developing countries or in regions where ground telecommunications coverage is inadequate (forest areas, deserts, etc.).

Of course, the present invention is not limited to the examples and embodiment described and shown, but is defined by the claims. In particular, it is susceptible to numerous variants accessible to the skilled artisan.

The invention claimed is:

1. A device suitable for being mounted on a satellite, comprising telecommunication means for broadcasting information directly to at least one telecommunication terminal on the ground, characterized in that the telecommunication means are adapted to broadcast said information via the Bluetooth Low Energy communication protocol, BLE, according to an "advertising" mode, according to which no incoming connection is accepted, said at least one telecommunication terminal being compatible with said communication protocol and configured to receive said information without sending any connection request to the satellite's communication means, said telecommunication means comprising:

a directional antenna adapted to transmit a signal carrying said information in a broadcast cone, with a transmission power greater than or equal to a few watts in a frequency band between 2.4 and 2.8 GHz, a data rate of at least 125 kbits/s, said transmission power being determined so that a power of a signal received by at least one said terminal located in the broadcast cone is above a given sensitivity of reception of said terminal for said "advertising" mode, as a function of an elevation of the satellite with respect to the ground, a directivity of the antenna, pointing parameters of the satellite and standard transmission losses related to passing through the atmosphere.

2. The device according to claim 1, for an observation satellite, further comprising:

at least one sensor for acquiring primary information processing means for analyzing said primary information to detect within said primary information a situation corresponding to a criterion, and determining secondary information relating to said situation; and said telecommunication means being provided to transmit said secondary information within said information.

3. The device according to claim 2, wherein said primary information is images.

4. The device according to claim 2, wherein said processing means are adapted to pre-compensate for a frequency shift related to the Doppler effect as a function of a position of said satellite, a position of said at least one telecommunication terminal, and the speed of said satellite relative to the ground.

5. The device according to claim 2, wherein said secondary information is representative of an alert.

6. The device according to claim 1, wherein the telecommunication means are adapted to broadcast said information via the Bluetooth Low Energy protocol, BLE, at 125 kbits/s with S=8 symbols per bit of information, said sensitivity of the telecommunication terminal being of the order of −103 dBm.

7. A satellite comprising a device according to claim 1.

8. A system comprising at least one satellite according to claim 7 and said at least one telecommunication terminal.

9. A computer program product comprising instructions which, when the program is executed by a computer, cause said computer to implement the method according to claim 1.

10. A method for broadcasting information from a satellite directly to at least one telecommunication terminal on the ground, characterized in that said method implements the Bluetooth Low Energy protocol, BLE, in "Advertising" mode, according to which telecommunication means of the satellite are adapted to broadcast said information without accepting any incoming connection and said at least one telecommunication terminal is compatible with said protocol and configured to receive said information without sending any connection request to the communication means of the satellite, said method comprising:

transmission by a matched directional antenna of a signal carrying said information in a broadcast cone, with a transmission power greater than or equal to a few watts, in a frequency band between 2.4 and 2.8 GHz, with a data rate of at least 125 kbits/s, said transmission power being determined so that a power of a signal received by at least one said terminal located in the broadcast cone is above a reception sensitivity of said terminal, corresponding to said "Advertising" mode, as a function of an elevation of the satellite with respect to the ground, a directivity of the antenna, satellite pointing parameters and standard transmission losses linked to passing through the atmosphere.

\*    \*    \*    \*    \*